G. J. TOWNLEY.
Check-Reins.
No. 143,860.　　　　　　　　Patented Oct. 21, 1873.
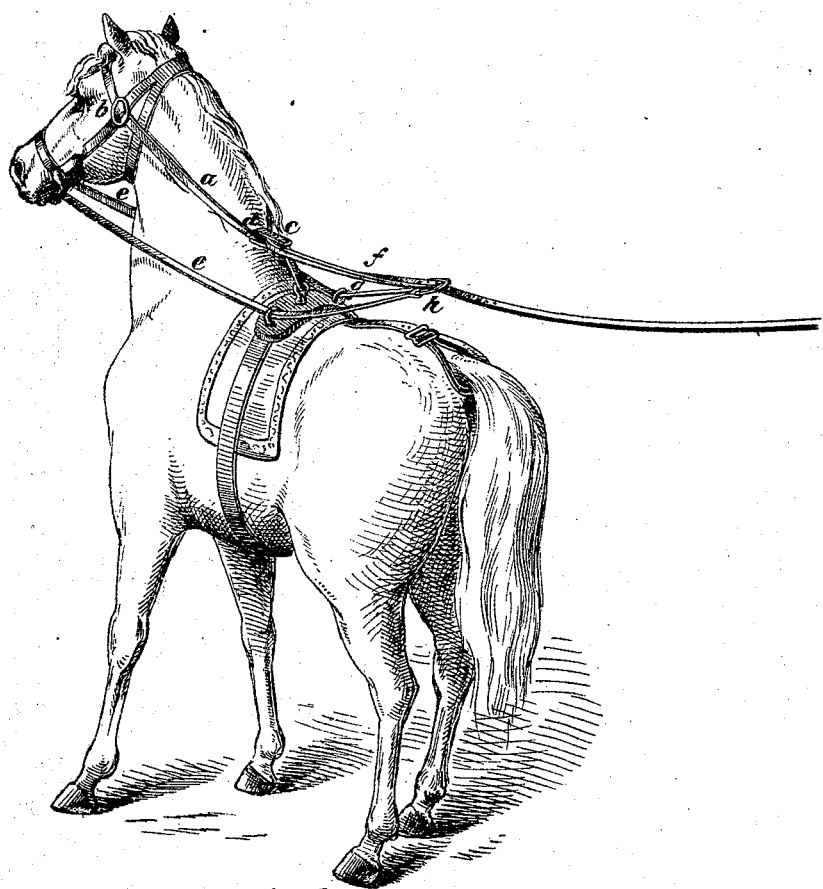
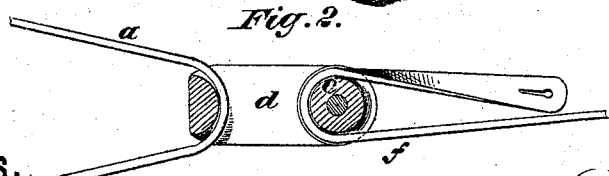
Witnesses.　　　　　　　　Inventor.
　　　　　　　　　　　　　Per
　　　　　　　　　　　　　Attorneys.

UNITED STATES PATENT OFFICE.

GEORGE J. TOWNLEY, OF PARMA, MICHIGAN.

IMPROVEMENT IN CHECK-REINS.

Specification forming part of Letters Patent No. 143,860, dated October 21, 1873; application filed May 24, 1873.

*To all whom it may concern:*

Be it known that I, GEORGE J. TOWNLEY, of Parma, in the county of Jackson and State of Michigan, have invented a new and useful Improvement in Check-Rein, of which the following is a specification:

The object of this invention is to provide means for controlling horses while they are in motion; and it consists in a check-rein arranged to operate as hereinafter described.

In the accompanying drawing, Figure 1 represents the check-rein applied as when in use. Fig. 2 shows it detached.

Similar letters of reference indicate corresponding parts.

$a$ is a check-rein attached to the head-stall at the point $b$ on each side of the horse's head. $c$ is a pulley attached by a frame, $d$, to this rein. $e$ represents the ordinary check-rein of the bridle. $f$ is a strap, one end of which is attached to the hook $g$ of the saddle or gig tree. The other end of this strap is passed around the pulley $c$, and coupled with the reins $e$, and extends back within reach of the driver.

This rein gives the driver complete control of the horse, as by the purchase which he obtains by means of the pulley he can draw the check just as tightly as he pleases, and stop him or check his speed if he is disposed to be unruly, or attempts to run away.

When on journeys of any length the driver can give the horse the check-rein, and thus relieve and rest him.

By means of this check the driver can compel the horse to carry his head in any desired position. By the ordinary method the horse's head is confined by the check to the saddle, and the horse has no rest until the check-rein is unhooked. By my improvement the driver can draw up or let out, as he pleases; he can give the horse the rein for watering him, or check him up as much as desired without leaving his seat.

This improvement may be applied to either single or double harness.

At the point $h$ the strap $f$ is buckled to the ordinary check-rein $e$. This rein, instead of being hooked to the saddle, passes through terrets on the saddle, and the ends are attached to the bridle, with which the strap $f$ is connected.

Having thus described my invention, I claim as new and desire to secure by Letters Patent—

The check-rein $a$, pulley $c$, and strap $f$, in combination with the head-stall of a horse, when arranged to operate as and for the purposes described.

GEORGE J. TOWNLEY.

Witnesses:
CHARLES E. MCGEE,
THOS. J. STIMSON.